United States Patent [19]
Nakamura et al.

[11] Patent Number: 5,768,887
[45] Date of Patent: Jun. 23, 1998

[54] DIRECT INJECTION TYPE COMPRESSION IGNITION ENGINE AND METHOD OF USE

[75] Inventors: Norihiko Nakamura, Mishima; Hiromichi Yanagihara, Gotenba, both of Japan

[73] Assignee: Toyota Jidosha Kabushiki Kaisha, Toyota, Japan

[21] Appl. No.: 636,927

[22] Filed: Apr. 24, 1996

[30]     Foreign Application Priority Data

Apr. 27, 1995  [JP]  Japan ................................. 7-103999
Feb. 27, 1996  [JP]  Japan ................................. 8-039944

[51] Int. Cl.$^6$ .............................. F01N 3/20; F01N 3/36; F02M 25/07; F02D 41/40
[52] U.S. Cl. .................... 60/274; 60/276; 123/378; 123/569; 123/571; 123/704
[58] Field of Search ................... 123/378, 569, 123/672, 673, 674, 681, 693, 694, 696, 695, 571, 704; 60/274, 275, 276, 299, 300

[56]            References Cited

U.S. PATENT DOCUMENTS

| 4,450,825 | 5/1984 | Sekiguchi et al. ............... 123/569 |
| 4,624,228 | 11/1986 | Sahara et al. .................. 123/378 |
| 4,664,086 | 5/1987 | Takeda et al. .................. 123/674 |
| 4,727,848 | 3/1988 | Stumpp et al. .................. 123/378 |
| 5,333,591 | 8/1994 | Korsmeier et al. ............... 123/704 |
| 5,473,887 | 12/1995 | Takeshima et al. ............... 60/276 |
| 5,582,005 | 12/1996 | Wunderlich et al. .............. 60/275 |
| 5,598,702 | 2/1997 | Uchikawa ....................... 60/274 |

FOREIGN PATENT DOCUMENTS

| A-0 027 689 | 4/1981 | European Pat. Off. . |
| A-56-2433 | 1/1981 | Japan . |
| B2-60-17938 | 5/1985 | Japan . |
| A-62-7943 | 1/1987 | Japan . |
| U-62-56743 | 4/1987 | Japan . |
| A-63-61765 | 3/1988 | Japan . |
| A-3-234793 | 10/1991 | Japan . |
| A-5-140568 | 6/1993 | Japan . |
| A-5-202373 | 8/1993 | Japan . |
| A-5-321655 | 12/1993 | Japan . |
| A-6-33839 | 2/1994 | Japan . |
| A-6-123218 | 5/1994 | Japan . |
| 2 000 222 | 1/1979 | United Kingdom . |
| WO 95/27128 | 10/1995 | WIPO . |

OTHER PUBLICATIONS

Society of Automotive Engineers of Japan, Inc., Symposium No. 9501, Jan. 30, 1995, "Effect of Oxygenated Fuel on Exhaust Emission from direct injection diesel engine", 8 pages.

Primary Examiner—Willis R. Wolfe
Attorney, Agent, or Firm—Oliff & Berridge, PLC

[57]            ABSTRACT

A compression ignition engine comprising a fuel injector arranged in the combustion chamber. Fuel containing oxygen is used as the fuel injected from the fuel injector to the combustion chamber. The mean air-fuel ratio in the combustion chamber is feedback controlled to a stoichiometric air-fuel ratio based on an output signal of an $O_2$ sensor. The NOx, HC, and CO produced at this time are removed by a three-way catalyst.

14 Claims, 15 Drawing Sheets

Fig.11A $L$ $G_{11}$  $G_{21}$  -------- $G_{m1}$ $G_{12}$ $G_{1n}$ ---------------- $G_{mn}$ $N$

Fig.11B $L$ $\theta_{11}$  $\theta_{21}$  -------- $\theta_{m1}$ $\theta_{12}$ $\theta_{1n}$ ---------------- $\theta_{mn}$ $N$

DIRECT INJECTION TYPE COMPRESSION IGNITION ENGINE AND METHOD OF USE

BACKGROUND OF THE INVENTION

1. Field of the Invention

The present invention relates to a direct injection type compression ignition engine.

2. Description of the Related Art

To obtain a high output power in an internal combustion engine, it is desirable to make the mean air-fuel ratio in the combustion chamber the stoichiometric air-fuel ratio. The same is true for a diesel engine. In a diesel engine which directly injects fuel into the combustion chamber, however, when the mean air-fuel ratio in the combustion chamber is made the stoichiometric air-fuel ratio, the atomized fuel becomes extremely rich and a large amount of soot is produced. Accordingly, in the past, it was not possible to make the air-fuel ratio in the combustion chamber of a diesel engine the stoichiometric air-fuel ratio and so the combustion chamber was given an excess of air (for example, see Japanese Unexamined Utility Model Publication (Kokai) No. 62-56743).

When injecting fuel into an intake passage, the injected fuel is uniformly dispersed in the combustion chamber, so even if the mean air-fuel ratio in the combustion chamber is made the stoichiometric air-fuel ratio, no soot is produced, but in this case explosive combustion occurs. According, this technique could not be adopted.

Therefore, in the past, there was the problem in diesel engines that the combustion chamber had to be given an excess of air and accordingly the engine output power could not be improved.

SUMMARY OF THE INVENTION

An object of the present invention is to provide a direct injection type compression ignition engine in which the output power can be improved.

According to the present invention, there is provided a compression ignition engine having a combustion chamber comprising fuel injection means for injecting fuel containing oxygen into the combustion chamber and means for determining an amount of fuel injected from the fuel injection means so that a mean value of an air-fuel ratio in the combustion chamber becomes equal to a target air-fuel ratio selected from one of the stoichiometric air-fuel ratio and a lean air-fuel ratio.

BRIEF DESCRIPTION OF THE DRAWINGS

The present invention may be more fully understood from the description of the preferred embodiments of the invention set forth below, together with the accompanying drawings, in which:

FIGS. 11A and 11B show maps of the degree of opening G of the EGR valve and the degree of opening $\theta$ of the throttle valve;

DESCRIPTION OF THE PREFERRED EMBODIMENTS

Figure 1:
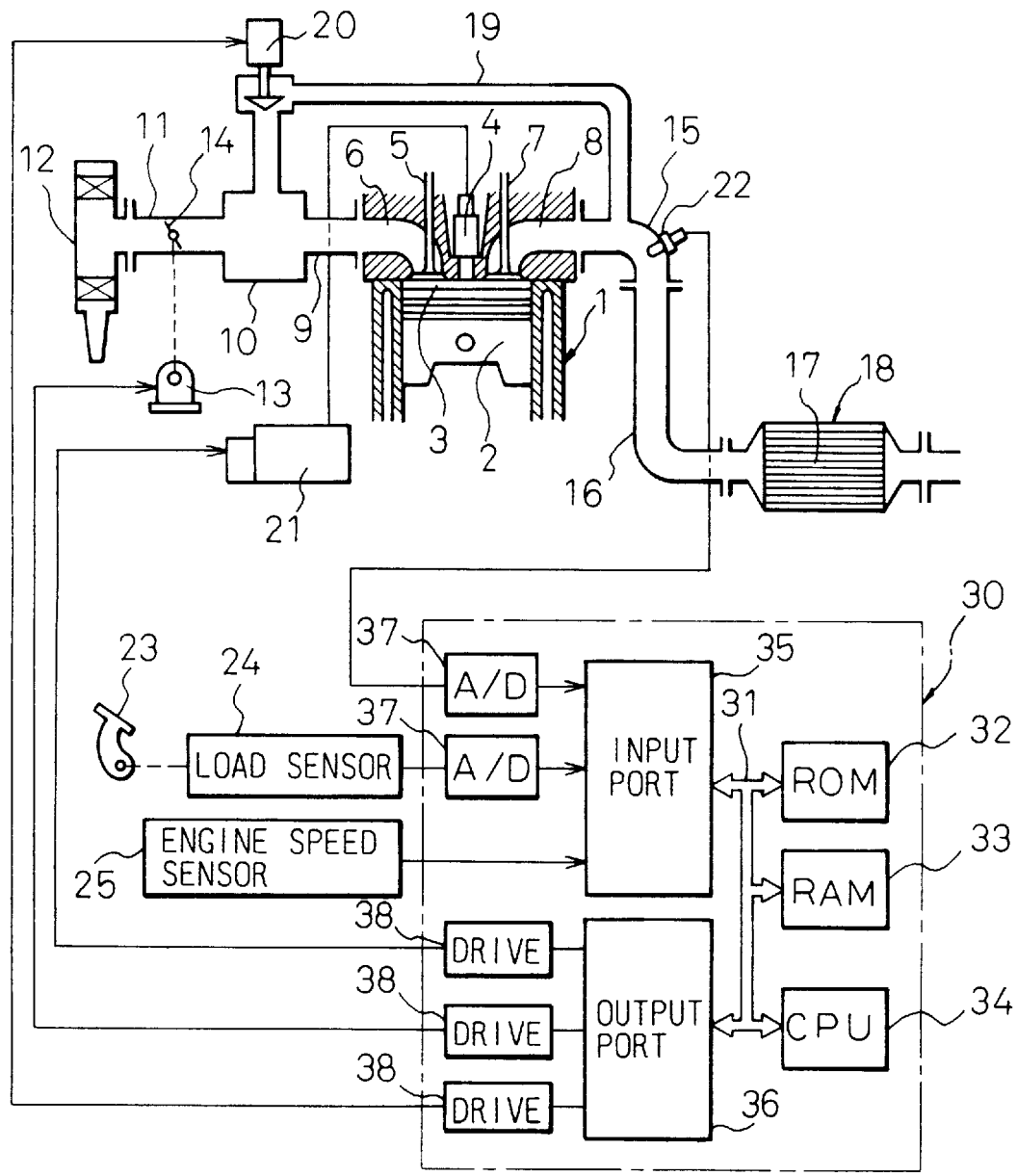
FIG. 1 is an overall view of an internal combustion engine.

Referring to FIG. 1, reference numeral 1 is a direct injection type compression ignition engine proper, 2 is a piston, 3 a combustion chamber, 4 a fuel injector for directly injecting fuel toward the combustion chamber 3, 5 an intake valve, 6 an intake port, 7 an exhaust valve, and 8 an exhaust port. The intake port 6 is connected to a surge tank 10 through a corresponding intake branch 9, while the surge tank 10 is connected to an air cleaner 12 through an intake duct 11. In the intake duct 11 is disposed a throttle valve 14 controlled to open and close by a drive motor 13. On the other hand, the exhaust port 8 is connected to a catalytic converter 18 housing a three-way catalyst 17 through an exhaust manifold 15 and an exhaust pipe 16.

The exhaust manifold 15 and surge tank 10 are connected to each other by an exhaust gas recirculation (EGR) passage 19. In this EGR passage 19 is disposed an EGR control valve 20 for controlling the amount of EGR gas recirculated in the surge tank 10 from the exhaust manifold 15. On the other hand, the fuel injector 4 is connected to a fuel injection pump 21 driven by the engine. The fuel injected from the fuel injection pump 21 is supplied to the fuel injector 4. This fuel injection pump 21 is controlled in discharge based on the output signal of an electronic control unit 30 and therefore the amount of injection from the fuel injector 4 is controlled based on the output signal of the electronic control unit 30.

The electronic control unit 30 is comprised of a digital computer which is provided with a read only memory (ROM) 32, a random access memory (RAM) 33, a microprocessor (CPU) 34, an input port 35, and an output port 36 connected to each other by a bi-directional bus 31. In the exhaust manifold 15 is disposed an air-fuel ratio sensor (hereinafter also called an $O_2$ sensor) for detecting the mean air-fuel ratio in the combustion chamber 3 from the concentration of oxygen in the exhaust gas. The output signal of the $O_2$ sensor is input to the input port 35 through a corresponding A/D converter 37. Further, an accelerator pedal 23 is connected to a load sensor 24 producing an output voltage proportional to the amount of depression of the accelerator pedal 23. The output voltage of the load sensor 24 is input to the input port 35 through a corresponding A/D converter 37. Further, the input port 35 has connected to it an engine speed sensor 35 producing an output pulse showing the engine speed. On the other hand, the output port 36 is connected to the drive motor 13, EGR control valve 20, and fuel injection pump 21 through a corresponding drive circuit 38.

In the embodiment shown in FIG. 1, fuel containing oxygen is used as the fuel injected from the fuel injector 4 to the inside of the combustion chamber 3. Further, the mean air-fuel ratio in the combustion chamber 3 is maintained at substantially the stoichiometric air-fuel ratio. In this case, as the fuel containing oxygen, use may be made of either fuel containing oxygen atoms in the molecules themselves or fuel obtained by adding an additive containing oxygen. No matter which type of fuel is used, oxygen ends up being contained in the fuel injected from the fuel injector 4.

Figure 2A:
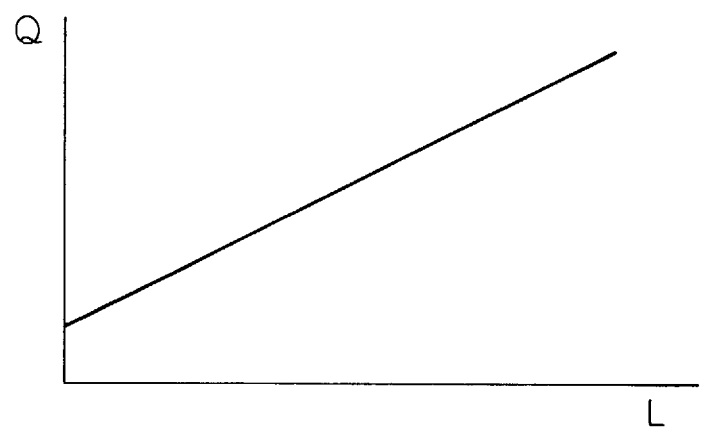
FIGS. 2A and 2B are views showing the amount of fuel injection, degree of opening of an EGR control valve, and degree of opening of a throttle valve.

FIG. 2A shows the relationship between the amount Q of injection of fuel containing oxygen and the amount of depression L of the accelerator pedal 23 in the case of a constant engine speed. As shown in FIG. 2A, the fuel injection amount Q becomes larger the greater the amount of depression L of the accelerator pedal 23, that is, the greater the engine load. Note that in practice the fuel injection amount Q is a function of not only the amount of depression L of the accelerator pedal 23, but also the engine speed N. Accordingly, the fuel injection amount Q is stored in advance in the ROM 32 in the form of the map shown in FIG. 3A.

Figure 2B:
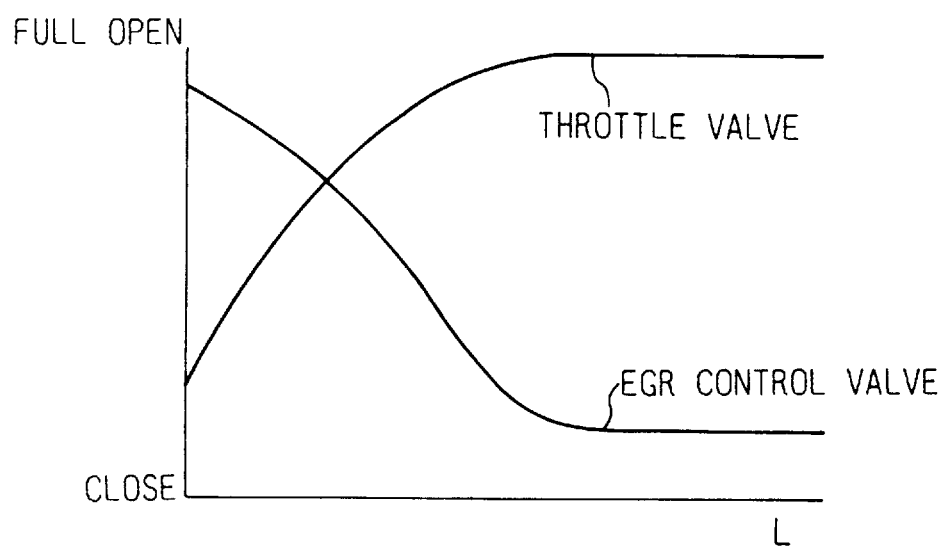

On the other hand, to maintain the mean air-fuel ratio in the combustion chamber 3 at substantially the stoichiometric air-fuel ratio, the method may be employed of increasing the amount of recirculation of the EGR gas and reducing the amount of intake air supplied into the combustion chamber 3 the lower the engine load or the method may be employed of reducing the degree of opening of the throttle valve 14 and reducing the amount of intake air supplied into the combustion chamber 3 the lower the engine load. Further, these methods may be employed at the same time. FIG. 2B shows the case of these methods employed simultaneously. In this case, as shown by FIG. 2B, the smaller the amount of depression L of the accelerator pedal 23, the greater the degree of opening the EGR control valve 20 is made, that is, the more the amount of EGR gas is increased and at the same time the smaller the degree of opening the throttle valve 14 is made. Note that in practice the degree of opening of the EGR control valve 20 and the degree of opening of the throttle valve 14 are functions of not only the amount of depression L of the accelerator pedal 23, but also the engine speed N. Accordingly, the degree of opening G of the EGR control valve 20 and the degree of opening θ of the throttle valve 14 are stored in advance in the ROM 32 in the form of the maps shown in FIG. 3B and 3C.

Figure 3A:
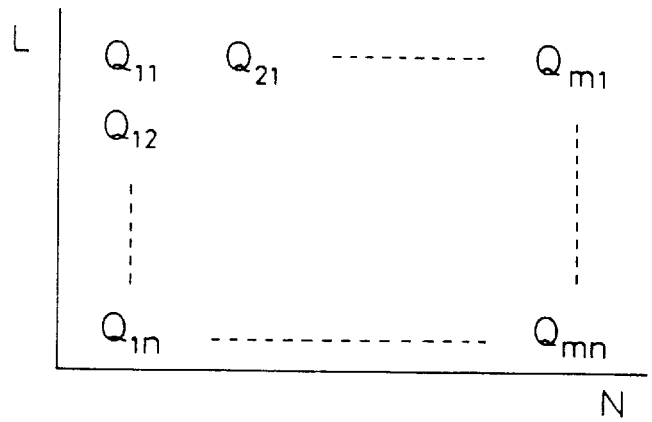
FIGS. 3A, 3B, and 3C show maps of the amount of fuel injection etc.
Figure 3B:
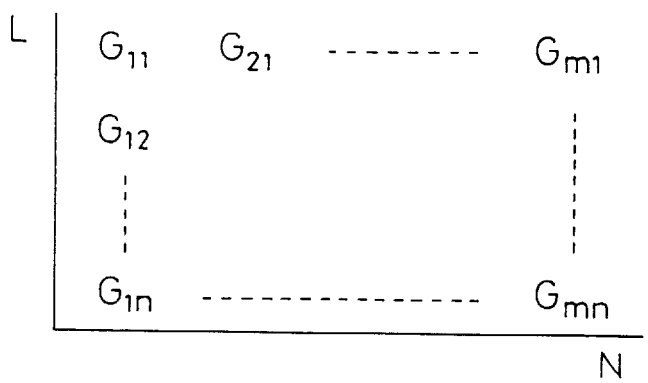

Accordingly, based on the amount of depression L of the accelerator pedal 23 and the engine speed N, when the value shown in FIG. 3A is made the fuel injection amount Q, the value shown in FIG. 3B is made the degree of opening G of the EGR control valve 20, and the value throttle valve 14, the mean air-fuel ratio in the combustion chamber 3 becomes substantially the stoichiometric air-fuel ratio. In this case, if oxygen is not included in the fuel, the fuel injected from the fuel injector 4 becomes extremely rich in the vaporized area and therefore a large amount of soot is produced. In the present invention, however, oxygen is included in the fuel, so the oxygen is uniformly dispersed in the vaporized fuel and therefore the fuel particles are burned in the presence of sufficient oxygen and excellent combustion not accompanied by the production of soot can be obtained. Note that the degree of opening G of the EGR control valve 20 shown in FIG. 3A and the degree of opening θ of the throttle valve 14 shown in FIG. 3C of course are set so that the air-fuel ratio in the combustion chamber 3 becomes the stoichiometric air--fuel ratio after considering the amount of oxygen included in the fuel.

In this way, in the embodiment shown in FIG. 1, the air-fuel ratio in the combustion chamber 3 can be maintained at substantially the stoichiometric air-fuel ratio, so it is possible to obtain a high engine output power.

Figure 3C:
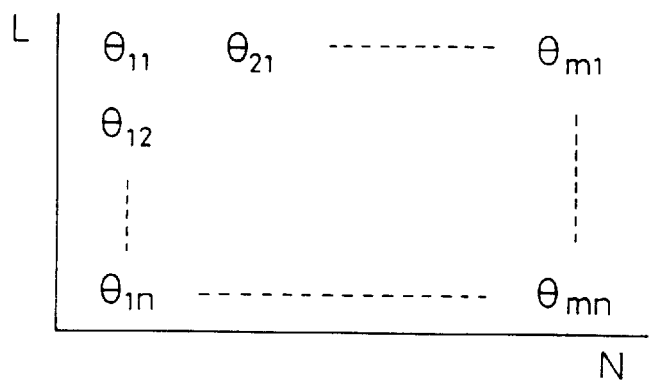

However, when the content of the oxygen in the fuel is different from the pretargeted content, if Q, G, and θ are determined from the maps shown in FIGS. 3A, 3B, and 3C, the mean air-fuel ratio in the combustion chamber 3 will end up deviated from the target air-fuel ratio $(A/F)_0$. Therefore, in the embodiment shown in FIG. 1, the fuel injection amount Q or the amount of EGR gas is feedback controlled based on the output signal of the $O_2$ sensor 22 so that the mean air-fuel ratio in the combustion chamber 3 becomes the stoichiometric air-fuel ratio. Note that performing feedback control in this way also enables the purification action of the three-way catalyst 17 on NOx, HC, and CO to be enhanced.

Figure 4:
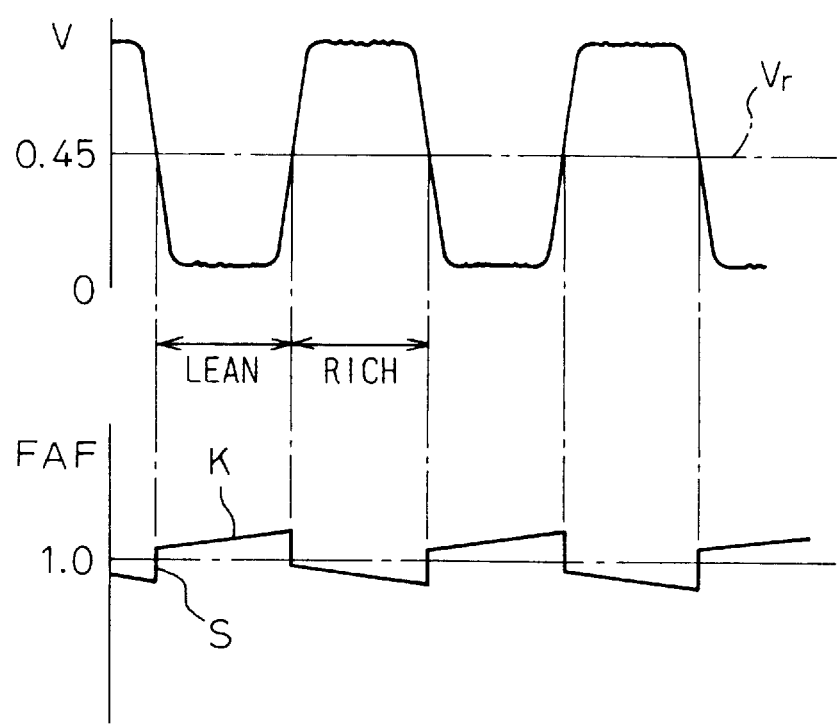
FIG. 4 is a view of the changes in the feedback correction coefficient FAF.

Next, the feedback control will be explained. The $O_2$ sensor 22 products an output voltage V of about 0.1V as shown in FIG. 4 when the mean air-fuel ratio in the combustion chamber 3 is lean and produces an output voltage V of about 0.9V when the mean air-fuel ratio in the combustion chamber 3 is rich. When performing feedback control on the fuel injection amount Q, the fuel injection amount Q is corrected by the feedback correction coefficient FAF. This feedback correction coefficient FAF is controlled based on the output voltage V of the $O_2$ sensor 22 as shown in FIG. 4.

Figure 5:
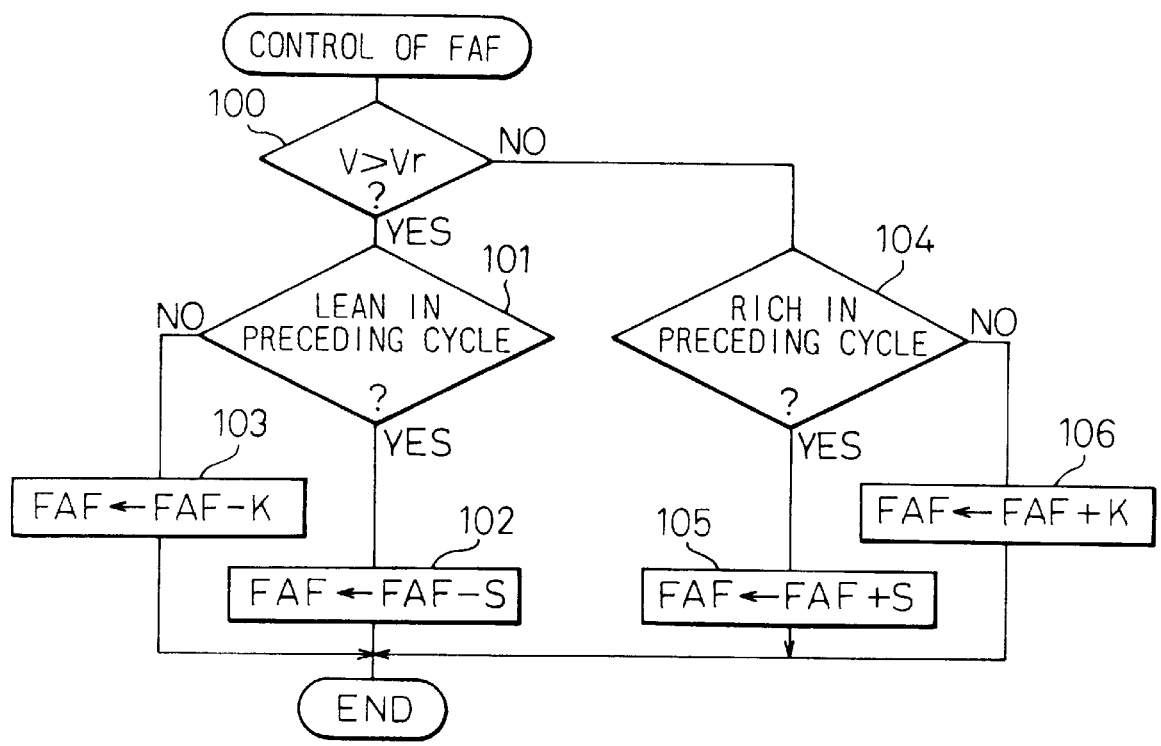
FIG. 5 is a flow chart of the control by the feedback correction coefficient.

FIG. 5 shows the routine for controlling the feedback correction coefficient FAF based on the output voltage V of the $O_2$ sensor 22. This routine is performed by interruption every predetermined time interval.

Referring to FIG. 5, first, at step 100, it is determined if the output voltage V of the $O_2$ sensor 22 is higher than a reference value Vr (FIG. 4). When V>Vr, that is, when the ratio is rich, the routine proceeds to step 101, where it is determined if the ratio was lean at the time of the previous interruption. When it was lean at the time of the previous interruption, the routine proceeds to step 102, where a skip value S is subtracted from the feedback correction coefficient FAF. As opposed to this, when the ratio was rich at the time of the previous interruption, the routine proceeds to step 104, where the integration value K (K<<S) is subtracted from FAF. Accordingly, as shown in FIG. 4, when the ratio changes from lean to rich, the FAF is rapidly decreased by the skip amount S and then gradually decreased.

On the other hand, when it is determined at step 100 that V≦Vr, that is, when it is determined that the ratio is lean, the routine proceeds to step 104 where it is determined if the ratio was rich at the time of the previous interruption. When it was rich at the time of the previous interruption, the routine proceeds to step 105, where the skip valve S is added to FAF. As opposed to this, when it was lean at the time of the previous interruption, the routine proceeds to step 106, where the integration value K is added to FAF. Accordingly, as shown in FIG. 4, when the ratio changes from rich to lean, the FAF is rapidly increased by the skip amount S and then gradually increased.

Figure 6:
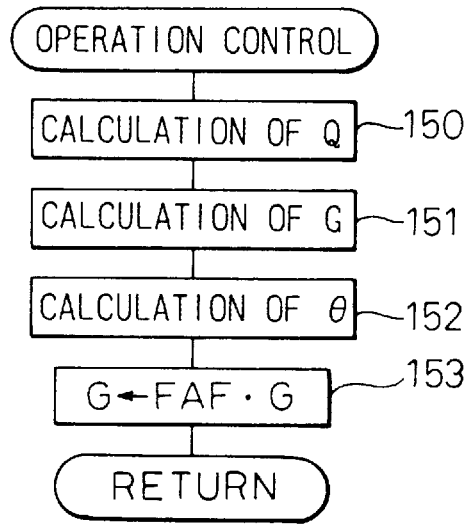
FIG. 6 is a flow chart of the control of the engine operation.

FIG. 6 shows the routine for controlling the operation of the engine. This routine is repeatedly executed.

Referring to FIG. 6, first, at step 150, the fuel injection amount Q is calculated from the map shown in FIG. 3A. Next, at step 151, the degree of opening G of the EGR control valve 20 is calculated from the map shown in FIG. 3B and the degree of opening of the EGR control valve 20 is controlled to this degree of opening G. Next, at step 152, the degree of opening θ of the throttle valve 14 is calculated from the map shown in FIG. 3C and the drive motor 13 is driven so that the throttle valve 14 becomes this degree of opening θ. Next, at step 153, the feedback correction coefficient FAF is multiplied with the fuel injection amount Q so as to find the final fuel injection amount Q and the fuel injection pump 21 is controlled to be able to inject this amount Q.

Figure 7:
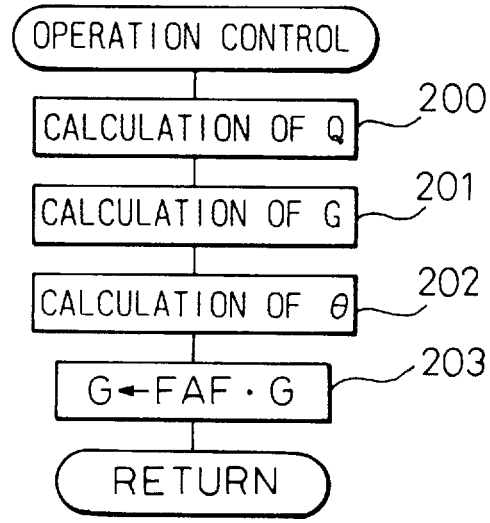
FIG. 7 is a flow chart of another embodiment for control of the engine operation.

FIG. 7 shows the routine for controlling the operation of the engine in the case of controlling the mount of EGR gas so that the mean air-fuel ratio in the combustion chamber 3 becomes the stoichiometric air-fuel ratio. Note that in this case as well, the routine shown in FIG. 5 is used for calculating the feedback correction coefficient FAF.

Referring to FIG. 7, first, at step 200, the fuel injection amount Q is calculated from the map shown in FIG. 3A and the fuel injection pump 21 is controlled so as to be able to inject this amount Q. Next, at step 201, the degree of opening G of the EGR control valve 20 is calculated from the map shown in FIG. 3B. Next, at step 202, the degree of opening θ of the throttle valve 13 is calculated from the map shown in FIG. 3C and the drive motor 13 is driven so that the throttle valve 14 becomes this degree of opening θ. Next, at step 203, the feedback correction coefficient FAF is multiplied with the degree of opening G of the EGR control valve 20 so as to find the final degree of opening G of the EGR control valve 20. The degree of opening of the EGR control valve 20 is controlled to this degree of opening G.

FIG. 8 to FIG. 18 show another embodiment. When using a fuel containing oxygen in the above way, it is possible to obtain excellent combustion not accompanied by the production of soot even if maintaining the air-fuel ratio at the stoichiometric air-fuel ratio. However, with some types of direct injection compression ignition engines, problems occur if maintaining the air-fuel ratio at the stoichiometric air-fuel ratio when the engine is operating under a light load or a heavy load. That is, when the engine is operating under a light load, a large amount of EGR gas is recirculated, so the amount of air in the combustion chamber 3 becomes small and therefore if the air-fuel ratio is maintained at the stoichiometric air-fuel ratio at this time, there is insufficient air, even if a fuel containing oxygen is used, and so the combustion becomes unstable.

Further, when the engine is operating under a high load with a large amount of fuel injection, the uneven dispersion of the injected fuel causes an overly rich air-fuel mixture region to be formed in the combustion chamber 3 and therefore at this time if the air-fuel ratio is made the stoichiometric air-fuel ratio, even if fuel containing oxygen is used, there will be insufficient air and therefore soot will be produced. Accordingly, it is necessary to make the air-fuel ratio lean when the engine is operating under a light load and operating under a heavy load in a compression ignition engine of this type. FIG. 8 to FIG. 18 show an embodiment suited to this type of compression ignition engine.

Figure 8:
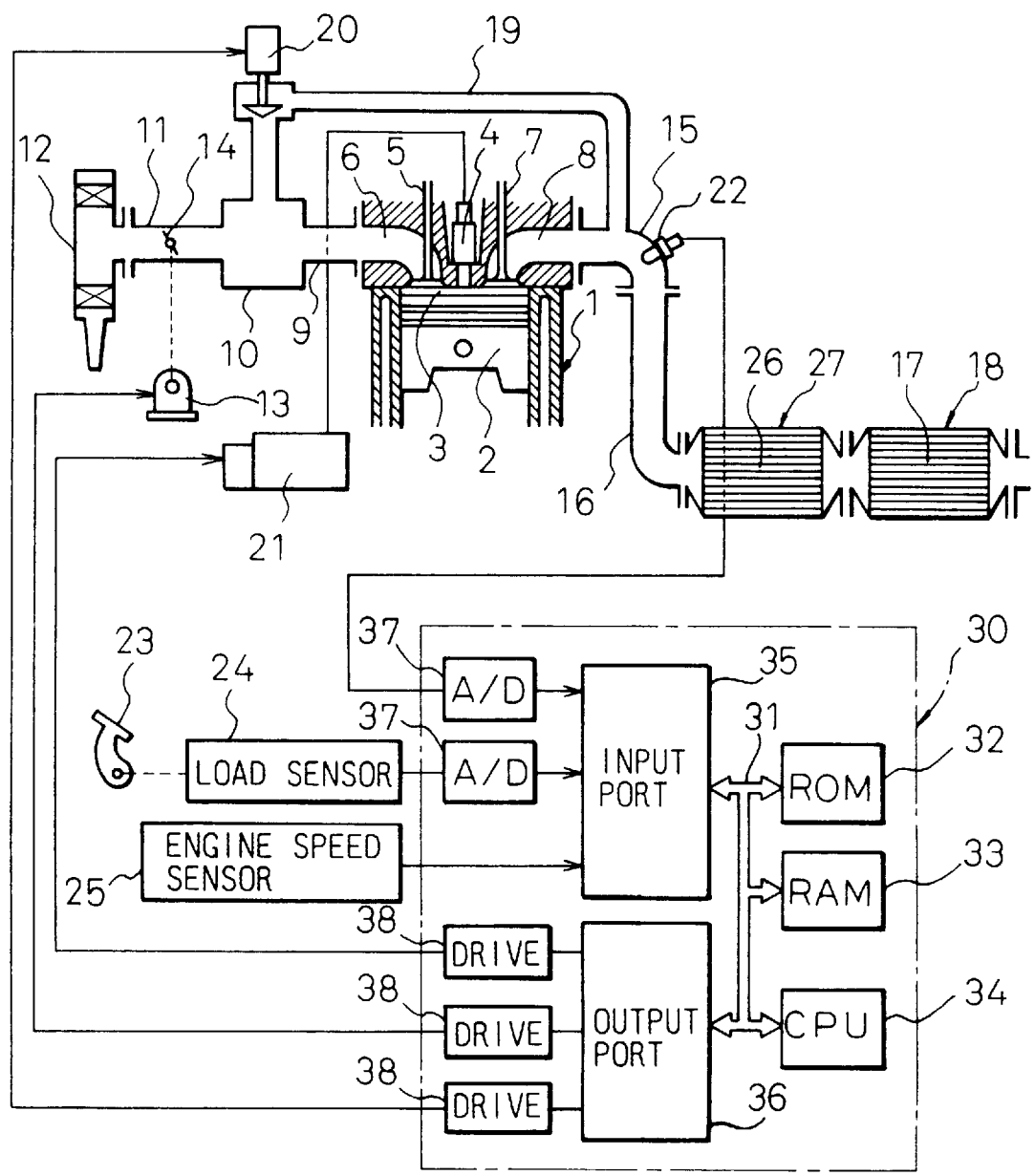
FIG. 8 is an overall view of another embodiment of the internal combustion engine.

First, referring to FIG. 8, in this embodiment, the casing 27 housing the NOx absorbent 26 is arranged in the engine exhaust passage upstream of the catalytic converter 18 housing the three-way catalyst 17.

Figure 9:
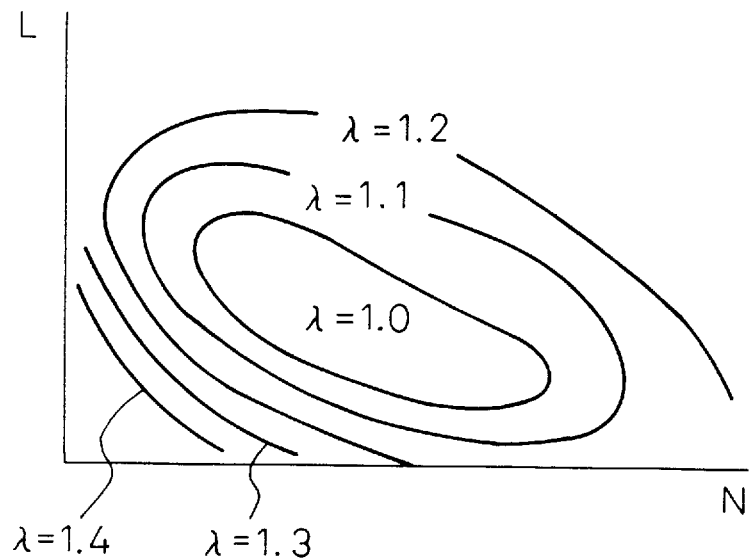
FIG. 9 is a view of the excess air rate $\gamma$, that is, the target air-fuel ratio $(A/F)_0$.

FIG. 9 shows the relationship among the amount of depression L of the accelerator pedal 23, the engine speed N, and the target excess air rate λ, that is, the target air-fuel ratio $(A/F)_0$. As shown in FIG. 9, when the engine is operating at a medium speed under a medium load, the target excess air rate λ is made 1.0, that is, the target air-fuel ratio $(A/F)_0$ is made the stoichiometric air-fuel ratio. In other areas, the target excess air rate λ is made larger than 1.0, that is, the target air-fuel ratio $(A/F)_0$ is made lean.

Figure 10:
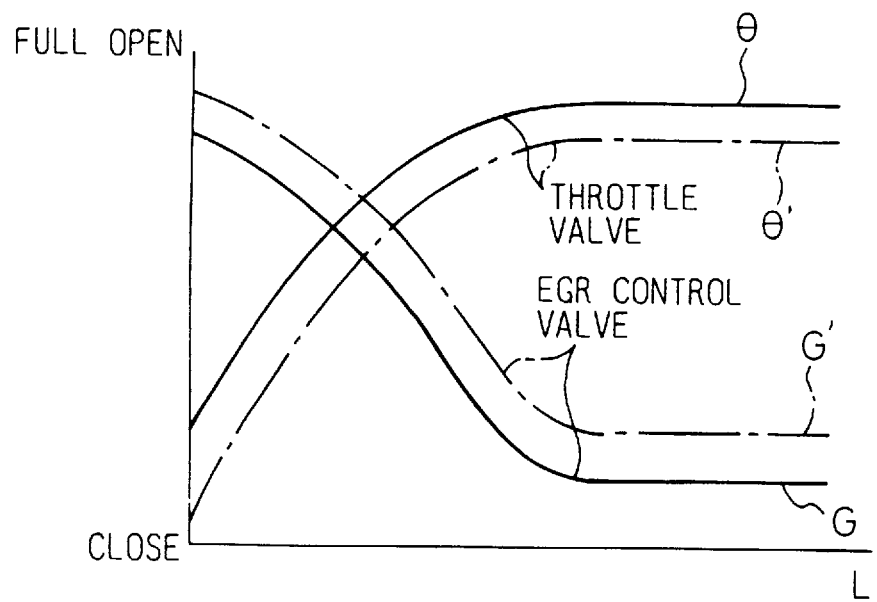
FIG. 10 is a graph of the degrees of opening of the EGR control valve and throttle valve.

On the other hand, to maintain the excess air rate λ at the target excess air rate shown in FIG. 9, that is, to maintain the mean air-fuel ratio in the combustion chamber 3 at the target air-fuel ratio $(A/F)_0$, the method may be employed of increasing the amount of recirculation of the EGR gas and reducing the amount of intake air supplied into the combustion chamber 3 the lower the engine load or the method may be employed of reducing the degree of opening of the throttle valve 14 and reducing the amount of intake air supplied into the combustion chamber 3 the lower the engine load. Further, these methods may be employed at the same time. The solid line in FIG. 10 shows the case of these methods employed simultaneously. In this case, as shown by the solid line in FIG. 10, the smaller the amount of depression L of the accelerator pedal 23, the greater the degree of opening the EGR control valve 20 is made, that is, the more the amount of EGR gas is increased and at the same time the smaller the degree of opening the throttle valve 14 is made. Note that in practice the degree of opening of the EGR control valve 20 and the degree of opening of the throttle valve 14 are functions of not only the amount of depression L of the accelerator pedal 23, but also the engine speed N. Accordingly, the degree of opening G of the EGR control valve 20 and the degree of opening θ of the throttle valve 14 are stored in advance in the ROM 32 in the form of the maps shown in FIG. 11A and 11B.

Accordingly, based on the amount of depression L of the accelerator pedal 23 and the engine speed N, when the value shown in FIG. 3A is made the fuel injection amount Q, the value shown in FIG. 11A is made the degree of opening G of the EGR control valve 20, and the value shown in FIG. 11B is made the degree of opening θ of the throttle valve 14, the mean air-fuel ratio in the combustion chamber 3 becomes the target air-fuel ratio $(A/F)_0$. Note that the degree of opening G of the EGR control valve 20 shown in FIG. 11A and the degree of opening θ of the throttle valve 14 shown in FIG. 11B are set so that the air-fuel ratio in the combustion chamber 3 becomes the target air-fuel ratio $(A/F)_0$ after considering the amount of oxygen included in the fuel.

However, when the content of the oxygen in the fuel is different from the pretargeted content, if Q, G, and θ are determined from the maps shown in FIG. 3A and FIGS. 11A and 11B, the mean air-fuel ratio in the combustion chamber 3 will end up deviated from the target air-fuel ratio $(A/F)_0$. Therefore, in this embodiment as well, the fuel injection amount Q is feedback controlled based on the output signal of the air-fuel ratio sensor 22 so that the mean air-fuel ratio in the combustion chamber 3 becomes the target air-fuel ratio $(A/F)_0$.

Figure 12:
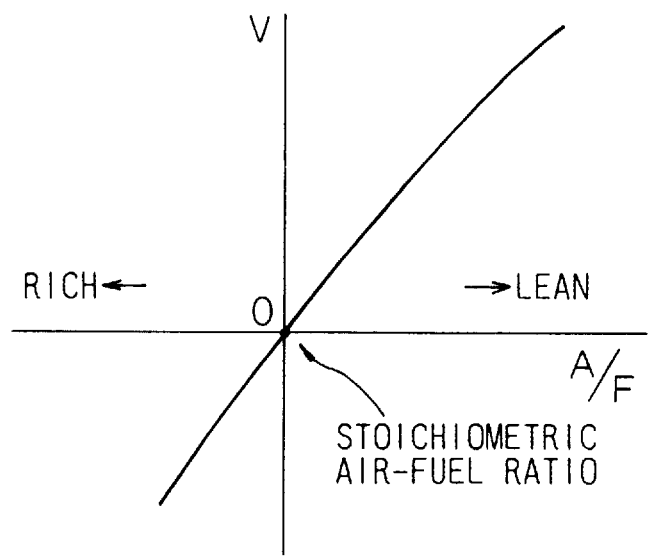
FIG. 12 is a graph of the output of the air-fuel ratio sensor.

Next, the feedback control will be simply explained. The air-fuel ratio sensor 22 shown in FIG. 8 has properties different from the $O_2$ sensor 22 shown in FIG. 1. FIG. 12 shows the relationship between the output voltage V of the air-fuel ratio sensor 22 shown in FIG. 8 and the mean air-fuel ratio A/F in the combustion chamber 3. From FIG. 12, it is learned that if the air-fuel ratio sensor 22 shown in FIG. 8 is used, it is possible to detect the mean air-fuel ratio A/F in the combustion chamber 3. In the embodiment shown in FIG. 8, when the mean air-fuel ratio A/F detected by the air-fuel ratio sensor 22 is larger than the target air-fuel ratio $(A/F)_0$, the fuel injection amount Q is increased, while when the mean air-fuel ratio A/F detected by the air-fuel ratio sensor 22 is smaller than the target air-fuel ratio $(A/F)_0$, the fuel injection amount Q is reduced. The mean air-fuel ratio A/F is controlled to the target air-fuel ratio $(A/F)_0$ in this way.

That is, in this embodiment, when the engine is operating at a medium speed under a medium load, the mean air-fuel ratio A/F is feedback controlled to the stoichiometric air-fuel ratio. At this time, the unburned HC, CO, and NOx contained in the exhaust gas are removed well by the three-way catalyst 17. On the other hand, when the engine is operating other than at medium speed and under a medium load, the mean air-fuel ratio A/F is feedback controlled to the target air-fuel ratio $(A/F)_0$. If the mean air-fuel ratio A/F is maintained lean, a large amount of NOx is produced, but this NOx is absorbed by the NOx absorbent 26. Next, therefore, this NOx absorbent 26 will be explained.

The NOx absorbent 16 contained in the casing 27 is for example comprised of a carrier of alumina on which are carried for example a precious metal such as platinum Pt and at least one element selected from the group of alkali metals such as potassium K, sodium Na, lithium Li, and cesium Cs, alkali earths such as barium Ba and calcium Ca, and rare earths such as lanthanum La and yttrium Y. If the ratio of the air and fuel supplied into the engine intake passage, combustion chamber 3, and exhaust passage upstream of the NOx absorbent 26 is defined as the air-fuel ratio of the inflowing exhaust gas flowing into the NOx absorbent 26, the NOx absorbent 26 absorbs the NOx when the air-fuel ratio of the inflowing exhaust gas is lean and releases the absorbed NOx when the concentration of oxygen in the inflowing exhaust gas falls, that is, performs an NOx absorbing and releasing action. Note that when the fuel or air is not supplied in the exhaust passage upstream of the NOx absorbent 26, the air-fuel ratio of the inflowing exhaust gas matches with the mean air-fuel ratio in the combustion chamber 3 and therefore in this case the NOx absorbent 26 absorbs the NOx when the mean air-fuel ratio in the combustion chamber 3 is lean and releases the absorbed NOx when the concentration of oxygen in the combustion chamber 3 falls.

Figure 13A:
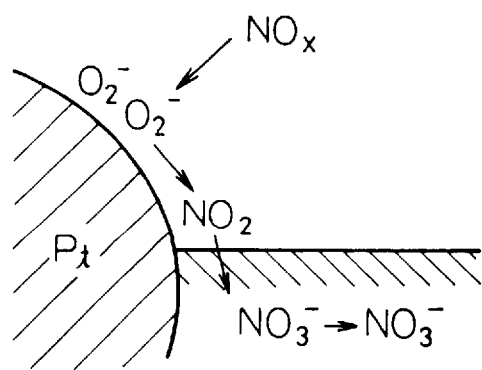
FIGS. 13A and 13B are views for explaining the absorbing and releasing action of an NOx absorbent.
Figure 13B:
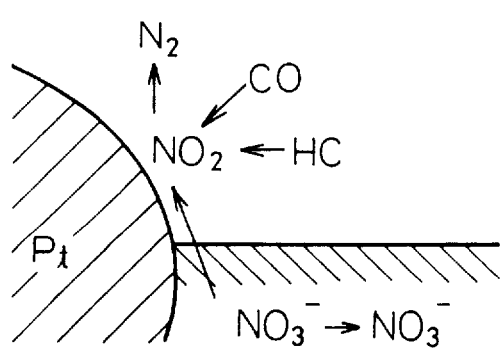

By placing the above NOx absorbent 26 in the engine exhaust passage, the NOx absorbent 26 does in actuality act to absorb and release NOx, but there are parts of the detailed mechanism of this absorbing and releasing action which are not clear. This absorbing and releasing action, however, is thought to be due to the mechanism as shown in FIGS. 13A and 13B. This mechanism will be explained next taking as an example the case of carrying platinum Pt and barium Ba on the carrier, but the same mechanism works when using other precious metals, alkali metals, alkali earths, and rare earths.

When the mean air-fuel ratio A/F in the combustion chamber 3 is maintained lean, the concentration of oxygen in the inflowing exhaust gas is high. Therefore, at this time, as shown in FIG. 13A, the oxygen $O_2$ is deposited on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt to become $NO_2$ ($2NO+O_2 \to 2NO_2$). Next, part of the produced $NO_2$ is oxidized on the platinum Pt and absorbed in the absorbent where it is bonded with the barium oxide BaO and dispersed in the absorbent in the form of nitrate ions $NO_3^-$ as shown in FIG. 13A. In this way, the NOx is absorbed in the NOx absorbent 26.

$NO_2$ is produced on the surface of the platinum Pt so long as the concentration of oxygen in the inflowing exhaust gas is high. $NO_2$ is absorbed in the absorbent and nitrate ions $NO_3^-$ are produced so long as the absorbent does not reach the end of its ability to absorb NOx. As opposed to this, when the concentration of oxygen in the inflowing exhaust gas falls and the amount of $NO_2$ produced drops, the reaction proceeds in the reverse direction ($NO_3^- \to NO_2$) and therefore nitrate ions $NO_3^-$ in the absorbent are released from the absorbent in the form of $NO_2$. That is, when the concentration of oxygen in the inflowing exhaust gas falls, NOx is released from the NOx absorbent 26. If the degree of leanness of the inflowing exhaust gas falls, the concentration of oxygen in inflowing exhaust gas falls. Therefore, if the degree of leanness of the inflowing exhaust gas falls, NOx is discharged from the NOx absorbent 26 even if the air-fuel ratio of the inflowing exhaust gas is lean.

On the other hand, when the mean air-fuel ratio in the combustion chamber 3 is made rich and the air-fuel ratio of the inflowing exhaust gas becomes rich at this time, a large amount of unburned HC and CO are exhausted from the engine. These unburned HC and CO react with the oxygen $O_2^-$ or $O^{2-}$ on the platinum Pt to be oxidized. Further, when the air-fuel ratio of the inflowing exhaust gas becomes rich, the concentration of oxygen in the inflowing exhaust gas drops sharply, so $NO_2$ is released from the absorbent. This $NO_2$ is reduced by reaction with the unburned HC and CO as shown in FIG. 13B. When there is no longer any $NO_2$ present on the surface of the platinum Pt, the $NO_2$ is released from the absorbent. Accordingly, when the air-fuel ratio of the inflowing exhaust gas is made rich, the NOx is released from the NOx absorbent 26 in a short time.

That is, when the air-fuel ratio of the inflowing exhaust gas is made rich, first, the unburned HC and CO react immediately with the $O_2^-$ or $O^{2-}$ on the platinum Pt to be oxidized, then if there is still unburned HC or CC) remaining even after the $O_2^-$ or $O^{2-}$ on the platinum Pt is consumed, the NOx released from the absorbent and the NOx exhausted from the engine are reduced. Accordingly, by making the air-fuel ratio of the inflowing exhaust gas rich, the NOx absorbed in the NOx absorbent 26 is released in a short time and, further, the exhausted NOx is reduced, so it is possible to prevent the release of NOx into the atmosphere. Further, since the NOx absorbent 26 has the function of a reduction catalyst, the NOx released from the NOx absorbent 26 can be reduced even if the air-fuel ratio of the inflowing exhaust gas is made the stoichiometric air-fuel ratio. However, when making the air-fuel ratio of the inflowing exhaust gas the stoichiometric air-fuel ratio, the NOx is released only gradually from the NOx absorbent 26, so it takes a somewhat long time to release all of the NOx absorbed in the NOx absorbent 26.

As explained above, when the mean air-fuel ratio A/F in the combustion chamber 3 is maintained lean, the NOx continues to be absorbed in the NOx absorbent 26.

However, there is a limit to the ability of the NOx absorbent 26 to absorb NOx. When the NOx absorbent 26 reaches its limit in capacity to absorb NOx, the NOx absorbent 26 can no longer absorb NOx. Accordingly, it is necessary to release the NOx from the NOx absorbent 26 before the NOx absorbent 26 reaches the limit of its capacity to absorb NOx. Therefore, it is necessary to estimate what degree of NOx has been absorbed in the NOx absorbent 26. The method of estimating the amount of absorption of NOx will be explained briefly next.

When the mean air-fuel ratio in the combustion chamber 3 is maintained lean, the higher the engine load becomes, the greater the NOx exhausted from the engine per unit time, so the greater the NOx absorbed in the NOx absorbent 26 per unit time. Further, the higher the engine speed, the greater the NOx exhausted from the engine per unit time, so the greater the NOx absorbed in the NOx absorbent 26 per unit time. Accordingly, the amount of NOx absorbed in the NOx absorbent 26 per unit time becomes a function of the engine load and the engine speed. Accordingly, in the embodiment shown in FIG. 8, the amount A of NOx absorbed in the NOx absorbent 26 per unit time is found in advance by experiments as a function of the amount of depression L of the accelerator pedal 23 and the engine speed N. The NOx amount A is stored in the advance in the ROM 32 in the form of the map shown in FIG. 14A as a function of L and N.

Figure 14A:
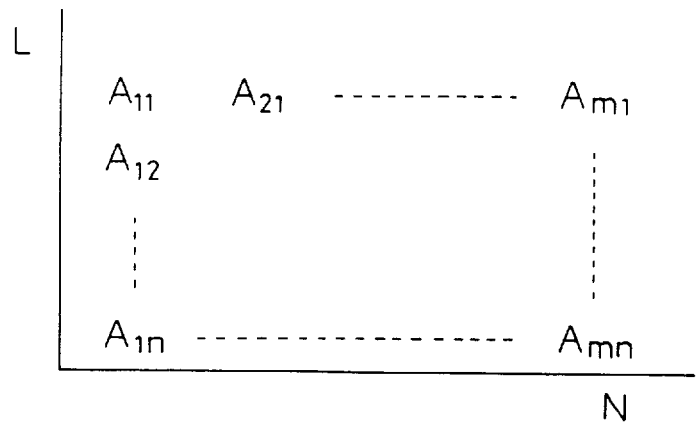
FIGS. 14A, 14B, and 14C show maps of the amount A of NOx absorption etc.
Figure 14B:
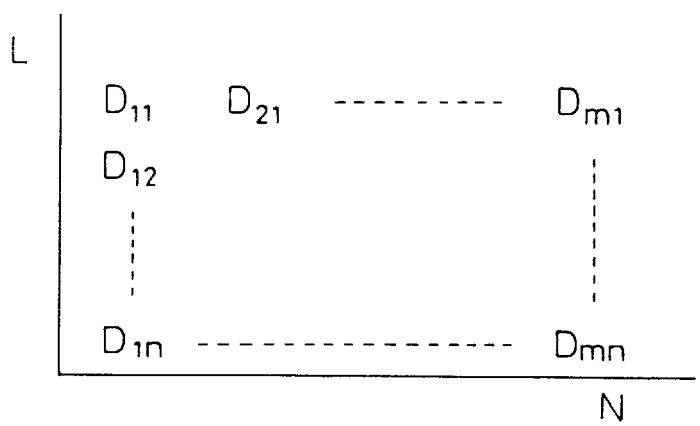
Figure 14C:
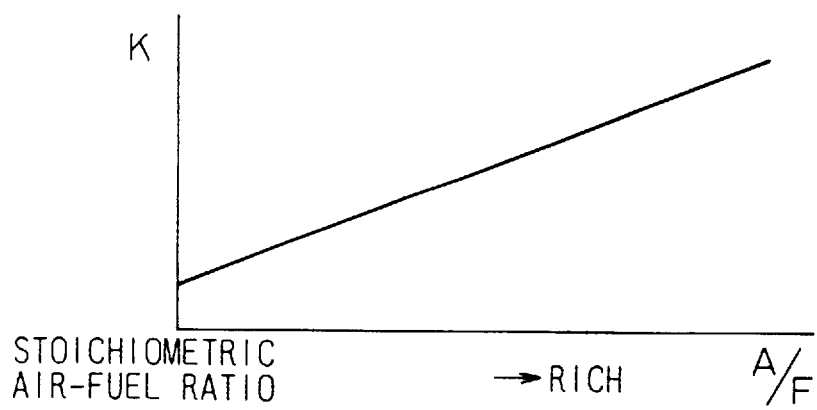

On the other hand, if the mean air-fuel ratio A/F becomes the stoichiometric air-fuel ratio or rich, the NOx is discharged from the NOx absorbent 26. At this time, the NOx release D released from the NOx absorbent 26 per unit time is proportional to the amount of exhaust gas and proportional to the degree of richness of the mean air-fuel ratio A/F. In this case, the amount of exhaust gas is a function of the amount of depression L of the accelerator pedal 23 and the engine speed N, so the NOx release D also becomes a function of the amount of depression L of the accelerator pedal 23 and the engine speed N. The NOx release D is stored in advance in the ROM 32 in the form of the map shown in FIG. 14B. On the other hand, when the degree of richness of the mean air-fuel ratio A/F becomes higher, the NOx release rate K becomes higher as shown in FIG. 14C and therefore when considering the NOx release rate K, the NOx release per unit time is expressed by K·D.

Since the NOx absorption per unit time is expressed by A and the NOx release per unit time is expressed by K·D in this way, the NOx estimated to be absorbed in the NOx absorbent 26, that is, ΣNOx, is expressed by the following equation:

$$\Sigma NOx = \Sigma NOx + A - K \cdot D$$

Figure 15:
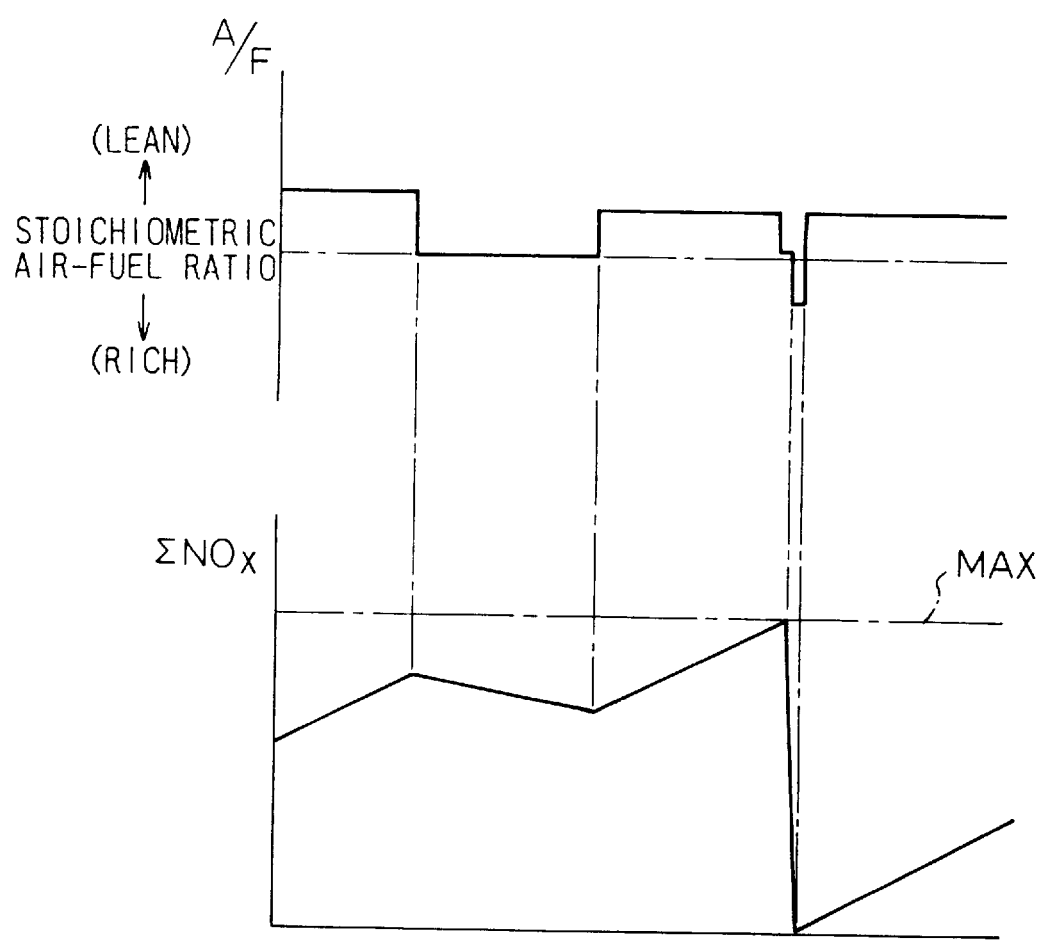
FIG. 15 is a time chart of the changes in the estimated absorbed NOx $\Sigma$NOx.

FIG. 15 shows the changes in the estimated absorbed NOx ΣNOx. As shown in FIG. 15, when the mean air-fuel ratio A/F is lean, the estimated absorbed NOx ΣNOx gradually increases. When the mean air-fuel ratio A/F is maintained at the stoichiometric air-fuel ratio, the estimated absorbed NOx ΣNOx is gradually reduced. Further, when the estimated absorbed NOx ΣNOx exceeds a previously determined upper limit MAX, the mean air-fuel ratio A/F is made rich for a short period in a spike fashion, where the NOx is made to be discharged from the NOx absorbent 26.

In the embodiment shown in FIG. 8, in this way, when the NOx is to be discharged from the NOx absorbent 26, the mean air-fuel ratio A/F in the combustion chamber 3 is made rich. However, in the present invention, oxygen is included in the fuel, so the oxygen is uniformly dispersed in the vaporized fuel and accordingly the fuel particles are made to burn in the presence of a large amount of oxygen, so only a small amount of soot is produced. That is, by using fuel containing oxygen in this way, it becomes possible for the first time to make the mean air-fuel ratio in the combustion chamber 3 rich.

Figure 16:
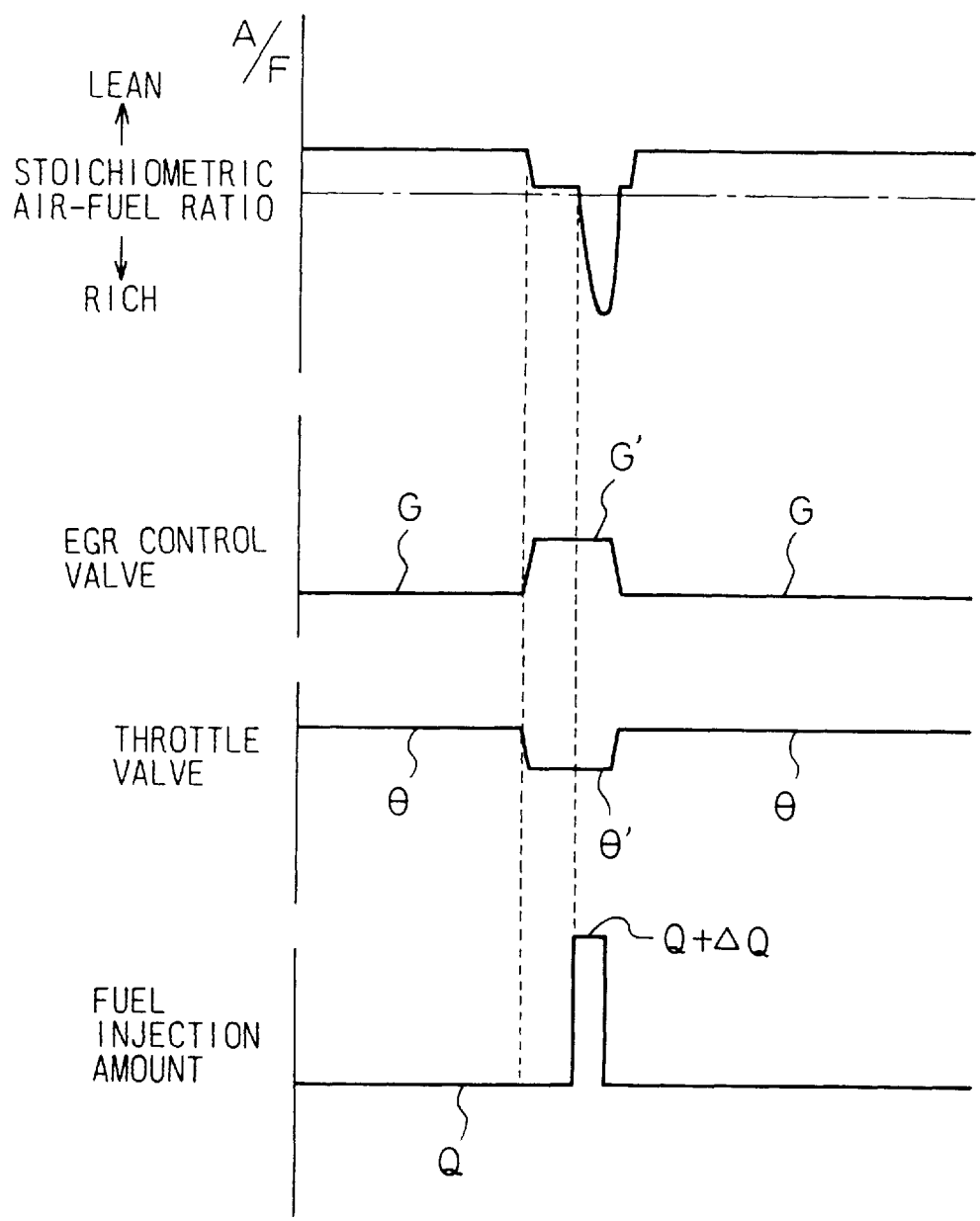
FIG. 16 is a time chart of the control of release of NOx.

However, if the controlling just the amount of fuel injection to make the mean air-fuel ratio in the combustion chamber 3 rich, that is, making the mean air-fuel ratio rich just by increasing the amount of fuel injection, the output torque rapidly increases and a shock is produced. Therefore, in the embodiment shown in FIG. 8, the degree of opening of the EGR control valve 20 is made larger and the degree of opening of the throttle valve 14 is made smaller and, further, the amount of fuel injection is increased so as to make the mean air-fuel ratio A/F rich. FIG. 16 shows the changes in the mean air-fuel ratio A/F etc. at this time. Note that the broken line in FIG. 10 shows the degree of opening G' of the EGR control valve 20 and the degree of opening θ' of the throttle valve 14 at this time.

Figure 17:
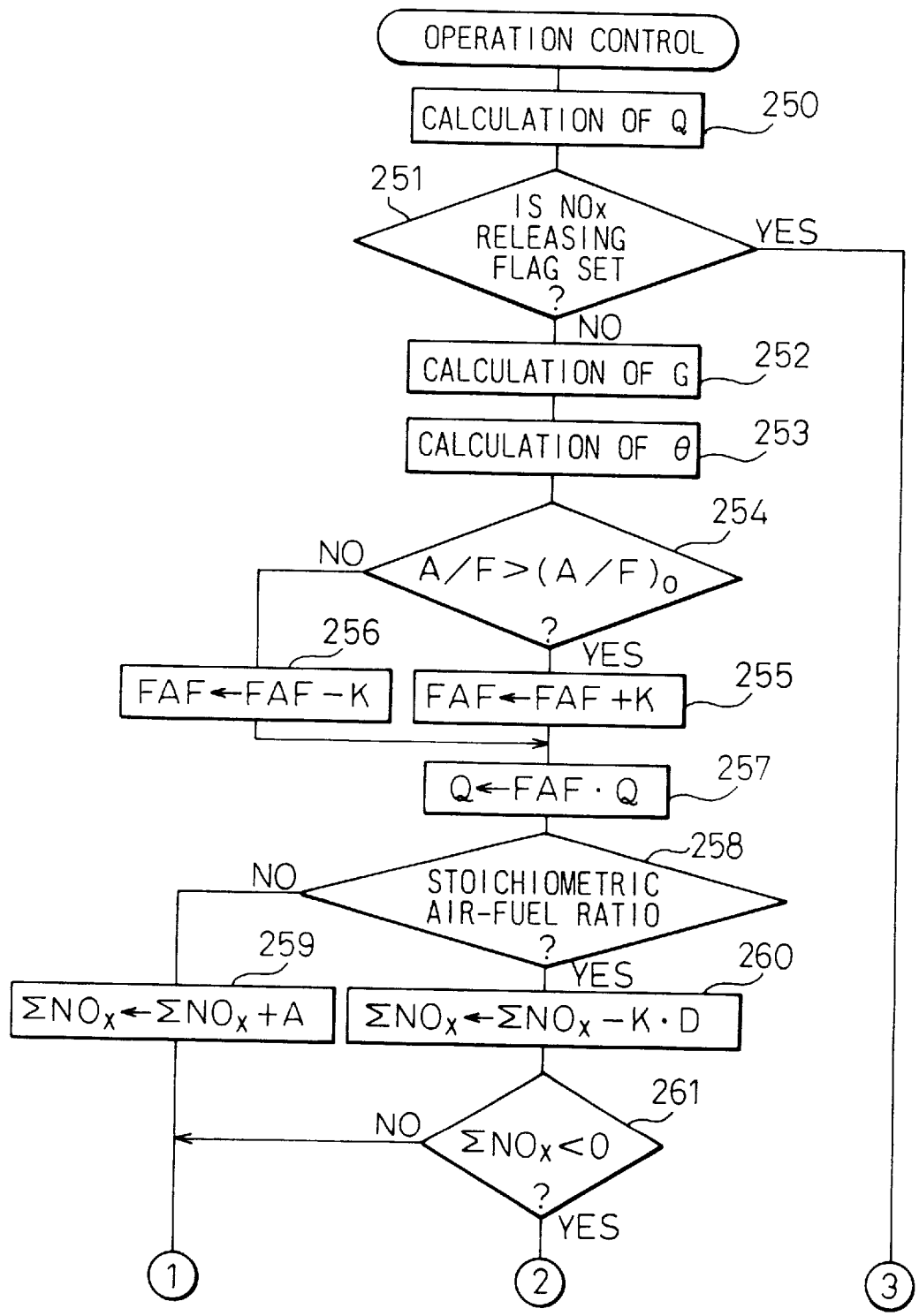
FIGS. 17 and 18 are flow charts for the control of the operation.
Figure 18:
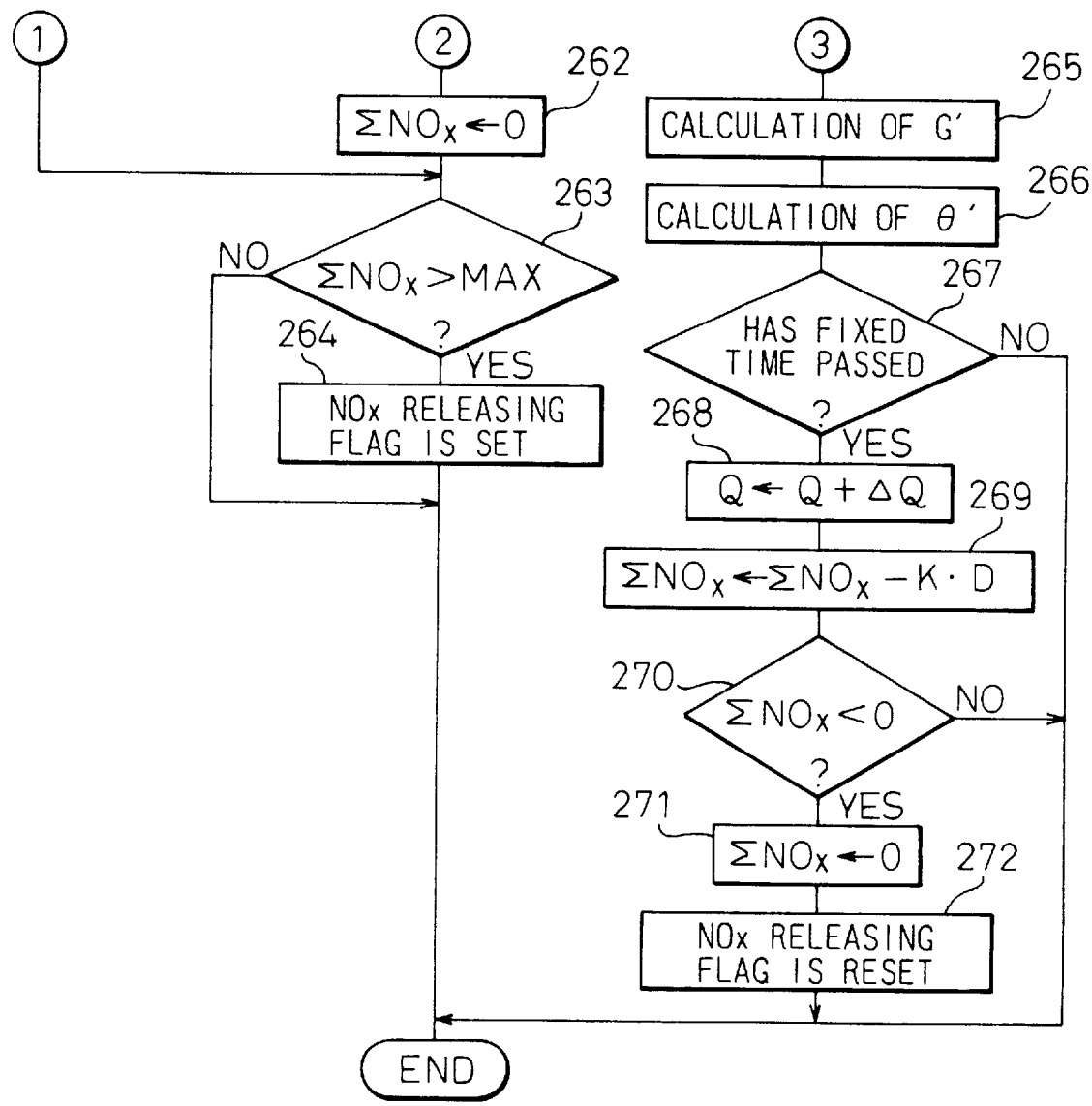

FIG. 17 and FIG. 18 show the routine for controlling the operation of the engine. The routine is executed for example by interruption at predetermined time intervals.

Referring to FIG. 17 and FIG. 18, first, at step 250, the fuel injection amount Q is calculated from the map shown in FIG. 3A. Next, at step 251, it is determined if the NOx releasing flag set when the NOx is to be released from the NOx absorbent 26 is set or not. When the NOx releasing flag is not set, the routine proceeds to step 252, where the degree of opening G of the EGR control valve 20 is calculated from the map shown in FIG. 11A, then at step 253, the degree of opening θ of the throttle valve 14 is calculated from the map shown in FIG. 11B.

Next, at step 254, it is determined if the mean air-fuel ratio A/F in the combustion chamber 3 detected by the air-fuel ratio sensor 22 is larger than the target air-fuel ratio $(A/F)_0$. When $A/F > (A/F)_0$, the routine proceeds to step 255, where a predetermined value K is added to the feedback correction coefficient FAF, then the routine proceeds to step 257. As opposed to this, when $A/F \leq (A/F)_0$, the routine proceeds to step 256, where the predetermined value K is subtracted from the feedback correction coefficient FAF, then the routine proceeds to step 257. At step 257, the feedback correction coefficient FAF is multiplied with the fuel injection amount Q so as to calculate the final fuel injection amount Q (=FAF·Q). That is, if $A/F > (A/F)_0$, the fuel injection amount Q is reduced, whereby the mean air-fuel ratio A/F is maintained at the target air-fuel ratio $(A/F)_0$. Note that FAF moves above and below the value 1.0.

Next, at step 258, it is determined if the target air-fuel ratio $(A/F)_0$ is the stoichiometric air-fuel ratio. When the target air-fuel ratio $(A/F)_0$ is not the stoichiometric air-fuel ratio, that is, when the target air-fuel ratio $(A/F)_0$ is lean, the routine proceeds to step 259, where the NOx absorption A shown in the map of FIG. 14A is added to the estimated absorbed NOx ΣNOx, then the routine proceeds to step 263. As opposed to this, when the target air-fuel ratio $(A/F)_0$ is the stoichiometric air-fuel ratio, the routine proceeds to step 260, where the product K·D of the NOx release D found from FIG. 14B and the NOx release rate K found from FIG. 14C based on the mean air-fuel ratio (14.7·Q/(Q+ΔQ)) is subtracted from the estimated absorbed NOx ΣNOx. Next, at step 261, it is determined if the estimated absorbed NOx ΣNOx has become negative or not. When ΣNOx<0, the routine proceeds to step 262, where the estimated absorbed NOx ΣNOx is made zero, then the routine proceeds to step 263.

At step 263, it is determined if the estimated absorbed NOx ΣNOx has exceeded the upper limit MAX. When ΣNOx≦MAX, the processing cycle ends. As opposed to this, when ΣNOx>MAX, the routine proceeds to step 264, where the NOx releasing flag is set. When the NOx releasing flag is set, at the next processing cycle, the routine proceeds from step 251 to step 265 where the release of NOx from the NOx absorbent 26 is controlled.

That is, at step 265, the degree of opening G' of the EGR control valve 20 shown in FIG. 10 was calculated and the EGR control valve 20 was opened to this degree of opening G'. Next, at step 266, the degree of opening θ' of the throttle valve 14 shown in FIG. 10 was calculated and the throttle valve 14 was closed to this degree of opening θ'. Next, at step 267, it is decided if a predetermined time has elapsed from the start of the operation for opening the EGR control valve 20 and the operation for closing the throttle valve 14. When a predetermined time has elapsed, the routine proceeds to step 268.

At step 268, the fuel injection amount Q is increased by exactly ΔQ whereby the mean air-fuel ratio A/F is made rich. Next, at step 269, the product K·D of the NOx release D found from FIG. 14B and the NOx release rate K found from FIG. 14C based on the mean air-fuel ratio (14.7·Q/(Q+ΔQ)) is subtracted from the estimated absorbed NOx ΣNOx. Next, at step 270, it is determined if the estimated absorbed NOx ΣNOx has become negative or not. When ΣNOx<0, that is, when all of the NOx has been released from the NOx absorbent 26, the routine proceeds to step 271, where the estimated absorbed NOx ΣNOx is made zero, then the routine proceeds to step 272, where the NOx releasing flag is reset. When the NOx releasing flag is reset, at the next processing cycle, the EGR control valve 20 is closed to the degree of opening G and the throttle valve 14 is opened to the degree of opening θ.

Note that in the embodiment shown in FIG. 8, the NOx absorbent 26 is arranged upstream of the three-way catalyst 17. If the NOx absorbent 26 is arranged upstream of the three-way catalyst 17 in this way, there is the advantage that the NOx which could not be reduced in the NOx absorbent 26 at the time of release of the NOx from the NOx absorbent 26 can be reduced by the three-way catalyst 17.

While the invention has been described by reference to specific embodiments chosen for purposes of illustration, it should be apparent that numerous modifications could be made thereto by those skilled in the art without departing from the basic concept and scope of the invention.

We claim:

1. A compression ignition engine having a combustion chamber, an exhaust manifold, an intake duct and a control system, the control system including a RAM, a ROM, a CPU and an input/output port all connected by a bus, the engine further comprising:
   an exhaust gas recirculation (EGR) passage;
   an EGR control valve disposed in the EGR passage, the EGR control valve controlling an amount of EGR gas recirculated in a surge tank from the exhaust manifold;
   a fuel injector, the fuel injector being controlled by an output signal of the control system, the fuel injector injecting fuel containing oxygen into the combustion chamber;
   an air-fuel ratio sensor disposed in the exhaust manifold, the air-fuel ratio detecting a mean air-fuel ratio in the combustion chamber from a concentration of oxygen in the exhaust gas; and
   a throttle valve associated with the air intake valve,
   wherein the mean air-fuel ratio in the combustion chamber is maintained in substantially the stoichiometric air-fuel ratio by at least one of (i) increasing an amount of recirculation of the EGR gas and (ii) reducing a degree of opening of the throttle valve and reducing an amount of intake air supplied into the combustion chamber when an engine load is low.

2. A method of setting a stoichiometric air-fuel ratio in a combustion chamber of a compression ignition engine, comprising:
   injecting fuel containing oxygen into the combustion chamber; and
   determining an amount of the fuel injected;
   setting a mean value, based in part on oxygen contained in the fuel, of an air-fuel ratio in the combustion chamber such that the mean value becomes equal to a target air-fuel ratio that is selected from the stoichiometric air-fuel ratio and a lean air-fuel ratio.

3. A compression ignition engine having a combustion chamber comprising:
   fuel injecting means for injecting fuel containing oxygen therein into the combustion chamber; and
   means for determining an amount of fuel injected from said fuel injecting means based in part on the oxygen contained in the fuel so that a mean value of an air-fuel ratio in the combustion chamber becomes equal to a target air-fuel ratio which is selected from the stoichiometric air-fuel ratio and a lean air-fuel ratio.

4. A compression ignition engine as set forth in claim 3, wherein exhaust gas recirculation control means is provided for controlling an amount of exhaust gas recirculated from an engine exhaust passage to an engine intake passage and wherein the lower the engine load, the larger the amount of recirculated exhaust gas.

5. A compression ignition engine as set forth in claim 4, wherein a throttle valve is arranged in an engine intake passage and wherein the lower the engine load, the smaller the degree of opening the throttle valve is made.

6. A compression ignition engine as set forth in claim 3, wherein a three-way catalyst and air-fuel ratio sensor are arranged in an engine exhaust passage and wherein air-fuel ratio feedback control means is provided for performing feedback control of the air-fuel ratio in the combustion chamber to a target air-fuel ratio based on an output signal of the air-fuel ratio sensor.

7. A compression ignition engine as set forth in claim 6, wherein said air-fuel ratio feedback control means performs feedback control of the air-fuel ratio in the combustion chamber to a target air-fuel ratio by controlling the amount of fuel injection.

8. A compression ignition engine as set forth in claim 6, wherein exhaust gas recirculation control means is provided for controlling the amount of exhaust gas recirculated from an engine exhaust passage to an engine intake passage and wherein said air-fuel ratio feedback control means performs feedback control of the air-fuel ratio in the combustion chamber to a target air-fuel ratio by controlling the amount of recirculated exhaust gas.

9. A compression ignition engine as set forth in claim 3, wherein an NOx absorbent for absorbing NOx when an air-fuel ratio of exhaust gas flowing into the NOx absorbent is lean and releasing the absorbed NOx when the air-fuel ratio of the exhaust gas flowing into the NOx absorbent is the stoichiometric air-fuel ratio or rich and an air-fuel ratio sensor are arranged in an engine exhaust passage and wherein air-fuel ratio feedback control means is provided for performing feedback control of the air-fuel ratio in the combustion chamber to a target air-fuel ratio based on an output signal of the air-fuel ratio sensor.

10. A compression ignition engine as set forth in claim 9, wherein exhaust gas recirculation control means is provided for controlling an amount of exhaust gas recirculated from an engine exhaust passage to an engine intake passage and wherein the amount of fuel injection is increased when the mean air-fuel ratio in the combustion chamber is switched from lean to rich to release NOx from the NOx absorbent.

11. A compression ignition engine as set forth in claim 9, wherein a throttle valve is arranged in an engine intake passage and the degree of opening of the throttle valve is made smaller when switching the mean air-fuel ratio in the combustion chamber from lean to rich so as to release NOx from the NOx absorbent.

12. A compression ignition engine as set forth in claim 9, wherein the amount of fuel injection is increased when the mean air-fuel ratio in the combustion chamber is switched from lean to rich to release NOx from the NOx absorbent.

13. A compression ignition engine as set forth in claim 9, wherein a three-way catalyst is arranged in the engine exhaust passage in addition to the NOx absorbent.

14. A compression ignition engine as set forth in claim 13, wherein the three-way catalyst is arranged downstream of the NOx absorbent.

\* \* \* \* \*